(12) United States Patent
Nakanishi

(10) Patent No.: US 7,603,402 B2
(45) Date of Patent: Oct. 13, 2009

(54) SOLUTION PROGRAM RECORDING MEDIA FOR SIMULTANEOUS LINEAR EQUATIONS HAVING BAND COEFFICIENT MATRIX

(75) Inventor: Makoto Nakanishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 725 days.

(21) Appl. No.: 11/006,385

(22) Filed: Dec. 7, 2004

(65) Prior Publication Data

US 2006/0064452 A1    Mar. 23, 2006

(30) Foreign Application Priority Data

Sep. 17, 2004 (JP) ............... 2004-272173

(51) Int. Cl.
*G06F 7/38* (2006.01)
*G06F 7/00* (2006.01)
(52) U.S. Cl. ...................... 708/446; 708/200
(58) Field of Classification Search ................ 708/446, 708/490, 607, 620, 200
See application file for complete search history.

(56) References Cited

U.S. PATENT DOCUMENTS 5,392,429 A * 2/1995 Agrawal et al. ............. 708/446
6,182,270 B1 * 1/2001 Feldmann et al. ............. 716/5
6,763,519 B1 * 7/2004 McColl et al. .............. 718/100

2002/0124035 A1 * 9/2002 Faber et al. ................. 708/400

FOREIGN PATENT DOCUMENTS

| JP | 02-021361 | 1/1990 |
| JP | 09-153022 | 6/1997 |
| JP | 10-326270 | 12/1998 |
| JP | 2002-163246 | 7/2002 |

OTHER PUBLICATIONS charalambous et al., A computational method for the LU decomposition of rectangular matrices and its implications to the realization of 2-D digitla filters, 1991, IEEE, pp. 626-629.*
SX-System Software Super-Ux Scientific and Technological Computing Library C Language Interface Aslicint/Sx User's Guide <Basic Functions, fascicle 1>, Japan Electric Corporation, Dec. 31, 1998, third edition, pp. 18, 24 and 63-70, No Translation.

* cited by examiner

*Primary Examiner*—Chat C Do
(74) *Attorney, Agent, or Firm*—Greer, Burns & Crain, Ltd.

(57) ABSTRACT

The solution program causes a computer to execute step 1 for performing, in parallel, the LU decomposition on the column block comprising a plurality of columns and for storing the result in the working area; step 2 for canceling the row permutation on the left of each column to the result in step 1 and for copying back the result in the array in compress mode; step 3 for saving the portion which may be damaged by updating the band matrix corresponding to the result in step 1; step 4 for updating the band matrix in parallel by using the result in step 1; and step 5 for returning the saved portion in step 3 to the result in step 4.

8 Claims, 15 Drawing Sheets

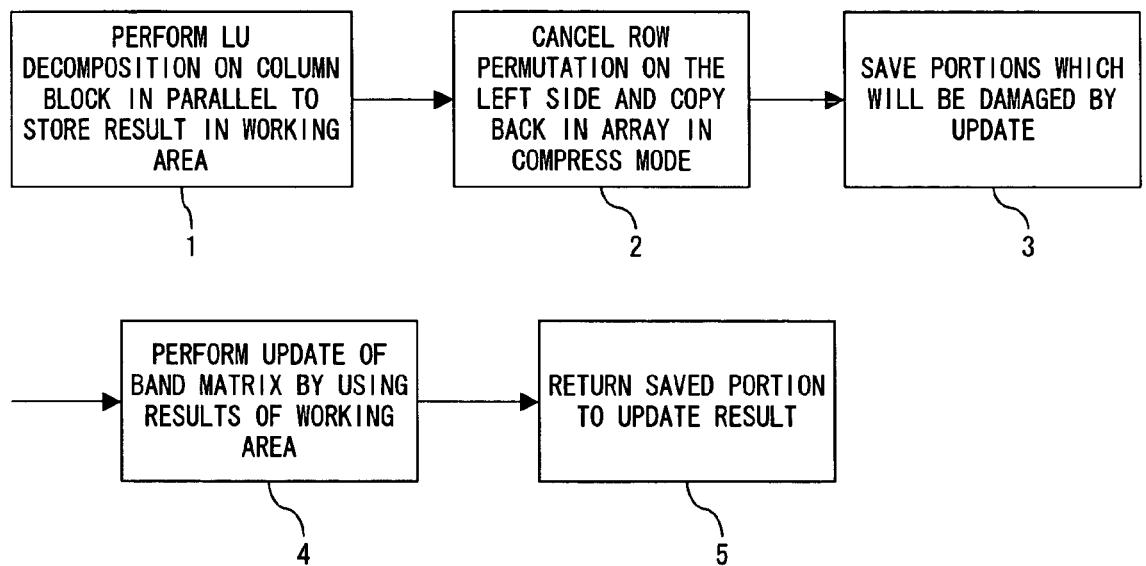
F I G. 1

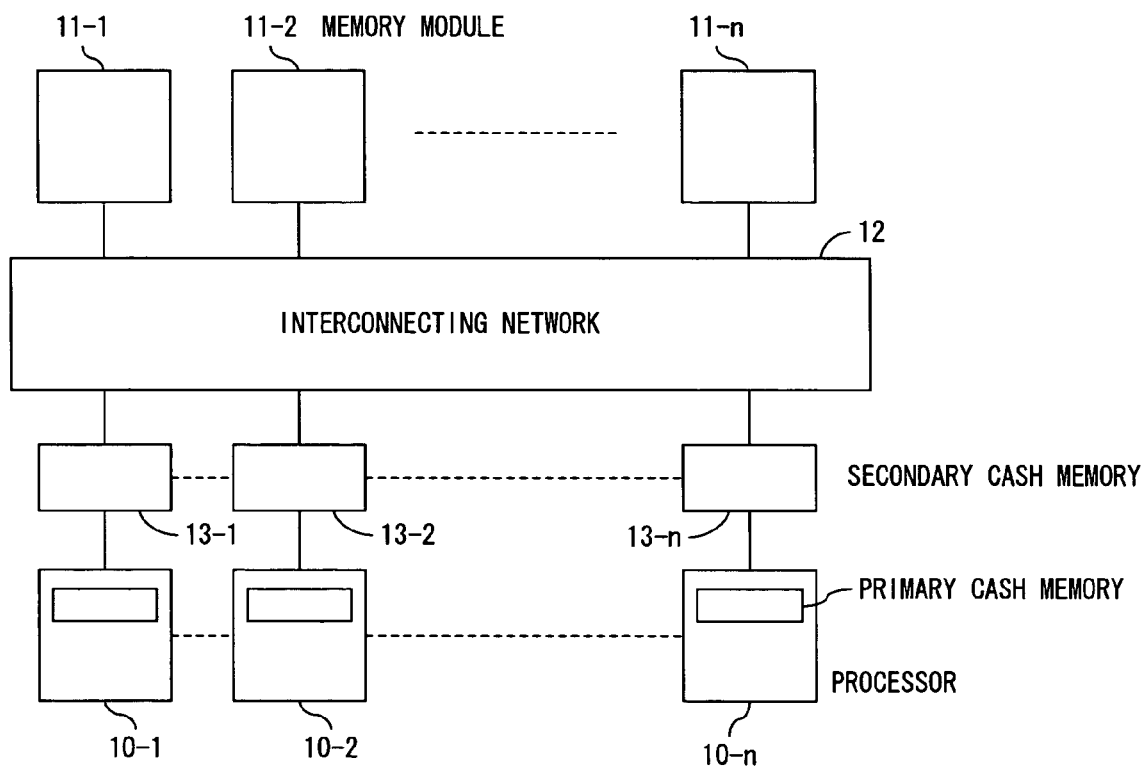
F I G. 2

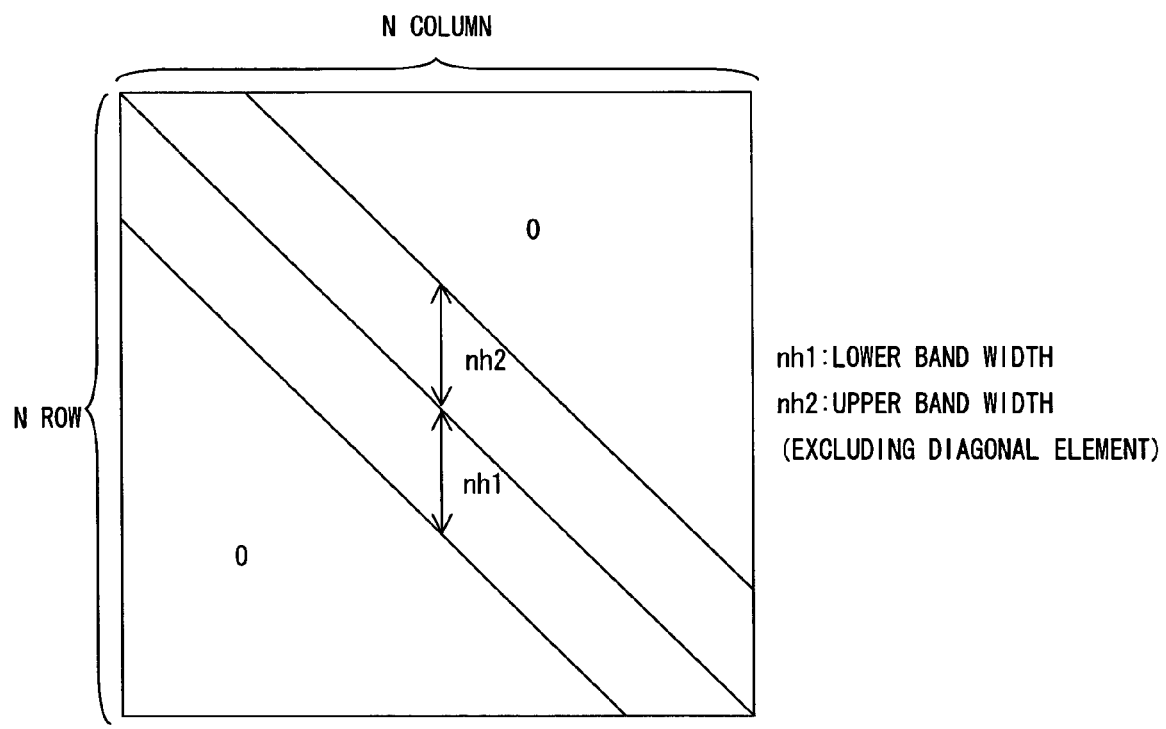
F I G. 3

F I G. 1 0

SOLUTION PROGRAM RECORDING MEDIA FOR SIMULTANEOUS LINEAR EQUATIONS HAVING BAND COEFFICIENT MATRIX

BACKGROUND OF THE INVENTION

1. Field of the Invention

The present invention relates to a solution for simultaneous linear equations which have a sparse matrix, namely a band matrix which is a typical example of a matrix having few factors which are not 0, as a coefficient matrix. In particular, the present invention relates a solution program recording media for simultaneous linear equations for solving such simultaneous linear equations with a common memory-type scalar parallel computer.

2. Description of the Related Art

When solving simultaneous linear equations with a computer, a method for solving equations based on Gaussian elimination is used, in which the simultaneous linear equations are expressed by a matrix, the equations are transformed to a format which allows an easier solution by performing computations such as LU decomposition of the matrix.

In other words, the simultaneous linear equations can be expressed in a format wherein the product of the matrix which shows the coefficient and the column vector which shows the variable is equal to a constant column vector. Here, the solution of the simultaneous linear equations can be found by using a method in which LU decomposition is performed to decompose the matrix showing the coefficient into the upper triangular matrix and the lower triangular matrix, and forward-substitution (forward elimination) and back-substitution is performed. Therefore, performing LU decomposition on the coefficient matrix is an important process in solving simultaneous linear equations. As the related art which efficiently performs the parallel processing of the LU decomposition by using a common memory-type scalar computer, the following patent reference filed by the applicant is disclosed: The Japanese Patent Laid-open Publication 2002-163246 "Parallel matrix processing in common memory-type scalar parallel computer and recording media".

In the reference, an operation method is disclosed which enables the realization of efficient processing by taking block D of the portion diagonal to the upper left portion corresponding to a plurality of matrixes on the left side of the matrixes on which LU decomposition is performed and the blocks in the matrix direction below D, dividing the blocks in the column direction on the lower side into three portions, L1 to L3, for example, allocating D+L1, D+L2, D+L3 individually to three processors, performing LU decomposition operation in parallel, thereafter, updating the blocks U comprising a plurality of rows on the right side of the block D in the diagonal portion, and furthermore, repeating the update process on the remaining matrixes by using L1 to L3 and U.

Conventionally, a method for performing LU decomposition based on Gaussian elimination is used for the solution of simultaneous linear equations which have a band matrix, out of the sparse matrixes having few factors which are not 0, where factors that are not 0 are present only near the main diagonal line as a coefficient matrix. In the conventional solution such as this, when storing the factors of the matrix in the memory, in order to efficiently store only the portion of the band where the factors that are not 0 are present, a compress storage mode which omits the storage of the factors that are 0 other than those in the band portion is used. In addition, in order to increase the stability of the solution of the LU decomposition, a partial pivoting is adopted. However, in order to reduce the storage area in compress storage mode, a method is used wherein row permutation is performed on only right side of the matrix if the row permutation is performed on each matrix by using the pivot. Furthermore, in update process of the LU decomposition, the operation in the form of the outer product of the vector is used.

The related art of the solution for the simultaneous linear equations with a band coefficient matrix such as this is described in the following references; G. H. Gorub, C. F. Van Loan; Matrix Computations, $3^{rd}$ Ed. The Johns Hopkins University Press, Baltimore and London (1996).

Generally, a scalar computer has a CPU with high operation performance, but low access performance to memory. For that reason, there was a first problem in that the performance of operation based on the outer product of the vector dependent upon the performance of the memory access was low, and efficiency was lower than that when processing by the vector computer.

Secondarily, there was a problem in that, because the band matrix is stored in the memory in compress mode where only the factors that are not 0 are stored, for example, each column is stored by each factor in the row direction, and update processing can not be performed by using the matrix product in the format as is; and in addition, even if attempt is made to perform the update using the matrix product, the values of the factors outside the storage area may be damaged when the number of the factors in the rows that require the permutations exceeds the storage area in compress mode.

Thirdly, as stated above, there was a problem in that, because the row permutation is performed in a partial pivot form on only the right side of the matrix, updates utilizing a form of the blocked matrix operation cannot be performed.

Fourthly, there was a problem in that if forward elimination is performed after the LU decomposition is completed, because the row permutation is performed in a partial pivot form on only the right side of the matrix, it is necessary to perform permutation on the solution vector as well, to perform update processing by operating the product of the vector and the scalar, and if the operation is processed in parallel, the overhead of the parallel processing increases and the effect of the parallel processing deteriorates.

SUMMARY OF THE INVENTION

The objective of the present invention is to solve the problems caused by the compress storage mode of the band matrix in the solution of the simultaneous linear equations having the band coefficient matrix, and to speed up the LU decomposition by utilizing the form of the blocked matrix operation, and to improve the efficiency of the parallelization in the forward-elimination processing to the result of the LU decomposition, in light of the foregoing problems.

In the program, the LU decomposition is performed on the column block comprising a plurality of columns inside the band matrixes in parallel, and the results stored in the working area; the row permutation performed on the left side is cancelled as the result of the pivoting selection in each column to the result of the LU decomposition; the data of the cancellation result is copied back to the band matrix in the compress format; and the portions that may be damaged by updating the matrix are saved, based on the relation between the maximum value of the length of the row which requires the permutation and the size of the array area of the band matrix in the compress form corresponding to the LU decomposition result of the column block.

Thereafter, the remaining portion of the band matrix is updated. In other words, the band matrix is updated in parallel by using the LU decomposition result of the column block stored in the working area, and the saved portion is returned to the updated result of the band matrix. Namely, the program according to the present invention allows the computer to execute the matrix operation comprising the afore-mentioned procedures.

In addition, the matrix operation is an operation for the LU decomposition of the band matrix. In the operation, after the matrix operation corresponding to the afore-mentioned column block in the uppermost left section of the band matrix is completed, the rows and the columns contained in the diagonal portion of the uppermost section in the column block can be removed from the band matrix, the matrix operation corresponding to the column block at the uppermost left section of the row after they are removed can be repeated, and the LU decomposition can be performed on the portion which ultimately remains, as well.

Furthermore, after the LU decomposition operation is performed on the remaining portion, by utilizing information on the row permutation performed in the parallel updating of the afore-mentioned band matrix, the row permutation corresponding to the pivoting selection can be performed on the left side of each column of the column block comprising a plurality of columns. In correspondence to this row permutation performed on the left side, the computer can also execute the parallel matrix operation comprising a procedure for permuting the factors corresponding to the column in the factors of constant vector in the simultaneous equations, a procedure for solving the simultaneous equations corresponding to the lower triangular matrix of the diagonal portion in the column block, and a procedure for updating the vector by computing the row vector product by using the row below the diagonal portion in the column block.

In this case, this parallel matrix operation is an operation for processing forward-substitution which uses the LU decomposition result of the band matrix, and after the parallel matrix operation corresponding to the column block of the uppermost left section in the band matrix is completed, the rows and the columns contained in the diagonal portion in the uppermost section of the column block can be removed, the parallel matrix operation corresponding to the column block in the uppermost left portion of the matrix after they are removed can be repeated, and the solution of the simultaneous equations to the lower triangular matrix of the diagonal block which ultimately remains can be found, as well.

Furthermore, in the parallel updating procedure of the band matrix, in regards to the band matrix in the compress form to which the data of the cancellation result is copied back, the matrix can be updated after compensating the positions of the rows of the factors in each column. In addition, by using the LU decomposition of the band matrix and the column blocks after the compensation, the row blocks corresponding to the diagonal matrixes inside the column blocks can be updated in parallel, and by using the update results of the row blocks, the rows corresponding to the column blocks and the row blocks can be updated in parallel.

Next, the solution program for the simultaneous equations which have band coefficient matrix according to the present invention permutes the rows corresponding to the pivoting selection on the left side of each column of the column blocks comprising a plurality of columns by utilizing information on the row permutation performed in the parallel updating of the band coefficient matrixes after the LU decomposition operation of the band coefficient matrixes has been completed, and the computer can execute the matrix operation comprising a procedure for permuting the factors corresponding to the column blocks inside the factors of the constant vector in the simultaneous equations according to the row permutation, a procedure for solving the simultaneous equations corresponding the lower triangular matrix of the diagonal portions of the column blocks, and a procedure for updating the vectors by computing the matrix vector product by using the lower matrixes of the diagonal portions in the column blocks.

According to the present invention, in the solution of the simultaneous linear equations which have the band matrix as the coefficient matrix, even if the band matrix is stored in the memory in compress storage mode, the LU decomposition of the coefficient matrix can be accelerated, and the efficiency of the parallel processing can be improved even in the processing of forward-substitution, thereby contributing significantly to the acceleration of the processing for finding the solution of the simultaneous linear equations with the band coefficient matrix.

BRIEF DESCRIPTION OF THE DRAWINGS

The present invention will be more apparent from the following detailed description when the accompanying drawings are referenced.

FIG. 1 is a theoretical function block diagram of the solution program for the simultaneous linear equations according to the present invention;

FIG. 2 is a diagram showing a hardware configuration example of the common memory-type scalar parallel computer which executes the program according to the present invention as a parallel processing;

FIG. 3 is a diagram explaining the form of the band matrix;

FIG. 10 is an explanatory diagram of the parallel update processing of the row blocks and the matrixes;

DESCRIPTION OF THE PREFERRED EMBODIMENTS

Figure 1:
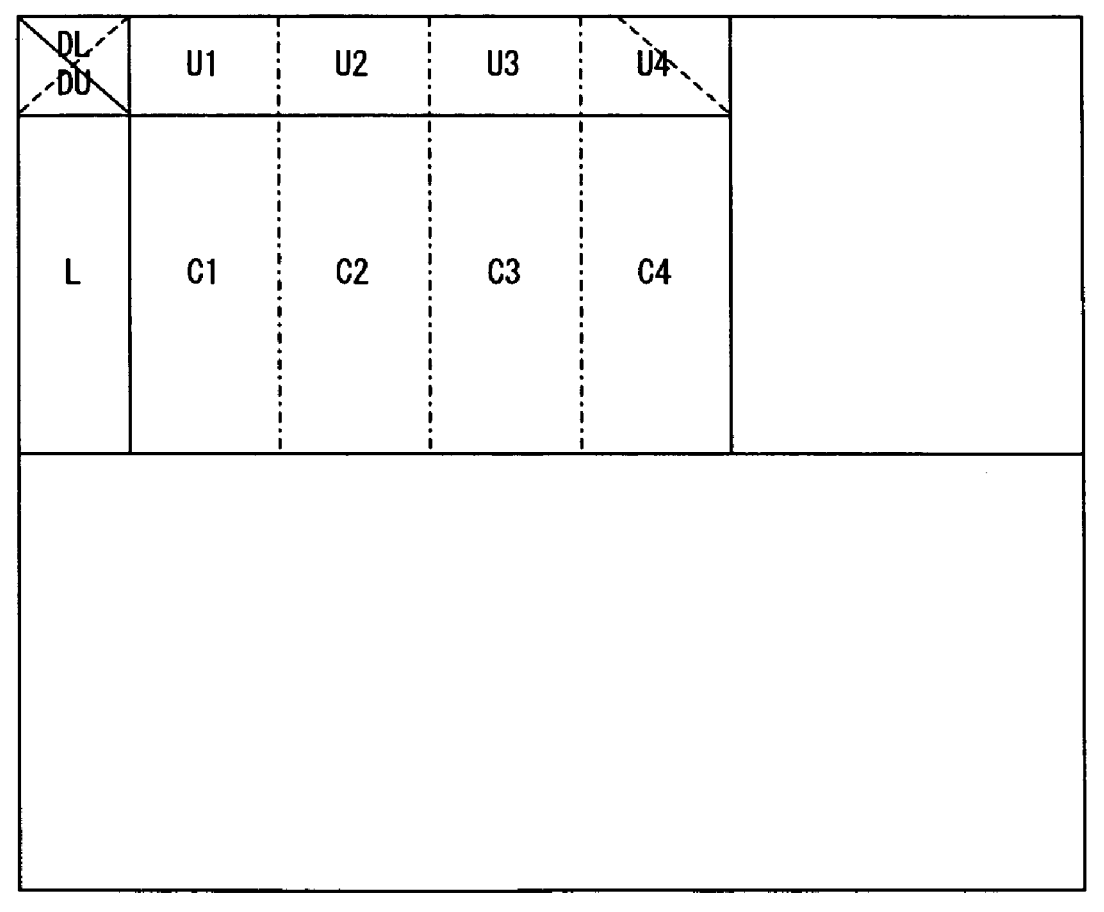
Figure 4:
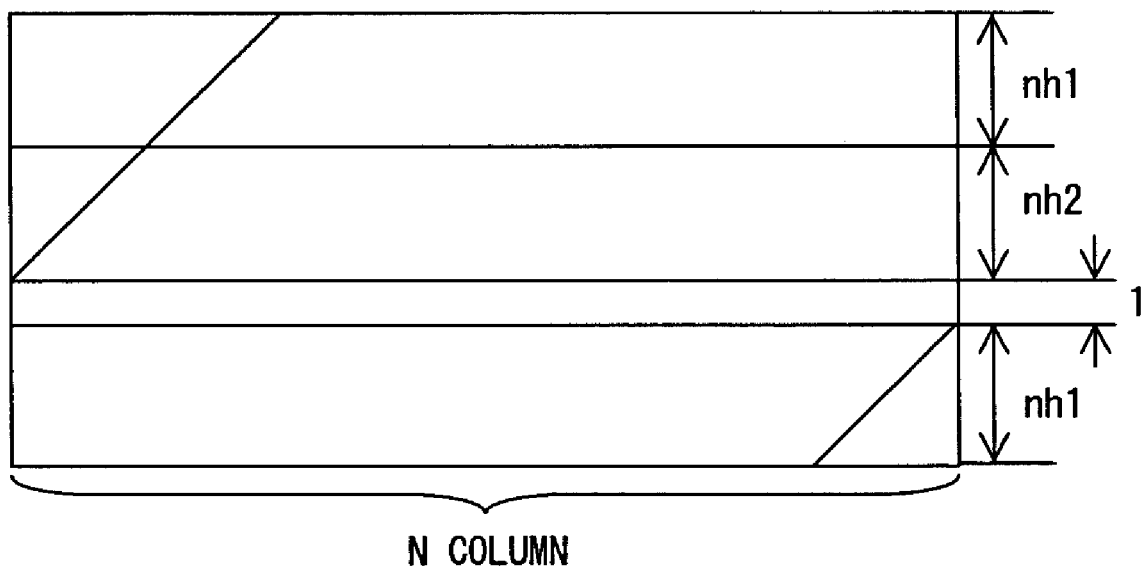
FIG. 4 is an explanatory diagram of the compress mode storage form of the band matrix.

FIG. 1 is a theoretical function block diagram of a solution program for the simultaneous linear equations according to the present invention. The same figure shows a solution program for the simultaneous linear equations which have the band coefficient matrix, and for example, is used by a common memory-type scalar parallel computer.

FIG. 2 is a block diagram showing a hardware configuration example of the common memory-type scalar parallel computer for finding the solution of the simultaneous linear equations by using the program according to the present invention. In the same figure, a plurality of processors 10-1, 10-2, - - -, 10-n comprising the common memory-type scalar parallel computer are connected to the interconnecting network 12 through a secondary cash memories 13-1, 13-2, - - -, 13-n.

Each of the processors 10-1, 10-2, - - -, 10-n is provided with a first cash memory internally or between the secondary cash memory and the processor, respectively. In addition, the processors 10-1, 10-2, - - -, 10-n are connected to memory modules 11-1, 11-2, - - -, 11-n through the interconnecting network 12 so as to allow the memory modules 11-1, 11-2, - - -, 11-n access thereto.

If the processors 10-1, 10-2, - - -, 10-n perform data processing, first, the data handled by each processor from the memory modules 11-1, 11-2, - - -, 11-n is stored in the secondary cash memories 13-1, 13-2, - - -, 13-n, and furthermore, the data which is the processing unit is copied to the first cash memory and processed.

After completing the processing, the processed data is stored from the first cash memory to the secondary cash memory, and when the processing of the data in the secondary cash memories is completed, the data is updated to the memory module within the memory modules 11-1, 11-2, - - -, 11-n which initially held the data. Parallel processing is performed by a plurality of the processors by repeating the processing in this way.

In this case, when each processor writes the processed data to the memory module and the data is again read from the memory module for the next processing, the processors must be synchronized. In other words, it is necessary to prevent other processors from reading data from the memory module until all processors complete updating the data in the memory modules. The synchronization of processing between processors such as this is called barrier synchronization.

FIG. 3 is an explanatory diagram of the band matrix as the coefficient matrix of the simultaneous linear equations which is the object in the present invention. In the same figure, the band matrix is a N-row, N-column square matrix, the factor which is not 0 is present only near the main diagonal line, and is a sparse matrix where the factors which are outside the width of a certain band of which the main diagonal line is the center are all 0. Taking one column near the center as an example, the number of the factors which may not be 0 in the lower part of the column from which the diagonal factors are removed is called the lower band-width nh1, and the number of the factors which may not be 0 in the upper part of the column from which the diagonal factors are removed is called the upper band width nh2.

FIG. 4 is an explanatory diagram of a storage form example in compress mode of the band matrix in FIG. 3. In the same figure, the area which has the uppermost side of the lower band width nh1 as the row number is an area wherein a value which is not 0 may be placed due to later permutation, and an area where all the factors are 0 when the band matrix is initially stored. The area of the row number nh2, below nh1, is an area which stores the factors of the upper band width, below nh2 is a one-row area for storing the diagonal factor, and further below is an area which stores the factors of the lower band width nh1.

When storing the band matrix in FIG. 3 in compress mode as shown in FIG. 4, taking for example FIG. 3, the columns are stored one by one starting from the leftmost column, excluding the area of the uppermost row number nh1 in FIG. 4. In other words, the leftmost column is the column which starts with the diagonal factor in FIG. 3, the factor which is not (may not be) 0 is stored in the area which stores the diagonal factor in FIG. 4, namely, in the area of the row number of nh1 from row number 1 and down. In the second column, because one factor exists above the diagonal factor, only this one factor is stored in the lowest position in bottom of the area of row number nh2, after which, the diagonal factor and the factors thereunder are sequentially stored.

After the column stored reaches the boundary of the upper band, all the factors which are not (may not be) 0 are stored by column in the area of row number nh2 and the area of row number nh1, and the number of the factors which are stored becomes constant as nh1+nh2+1.

Furthermore, after the lower end of the column reaches the bottom row of the matrix in FIG. 3, the factors which are stored in the area of row number nh1 on the lower side in FIG. 4 are reduced one by one, and the only factors stored in the rightmost column is the factor on the upper band side and the diagonal factor. Therefore, in FIG. 4, indefinite values, all 0s for example, are stored in the upper left side of the area of row number nh2 and the triangular area of the right lower side in the area of lower row number nh1. In addition, as the storage form of the band matrix in compress mode, various storage forms such as storage by row unit can be also used in place of storage by column unit.

Figure 5:
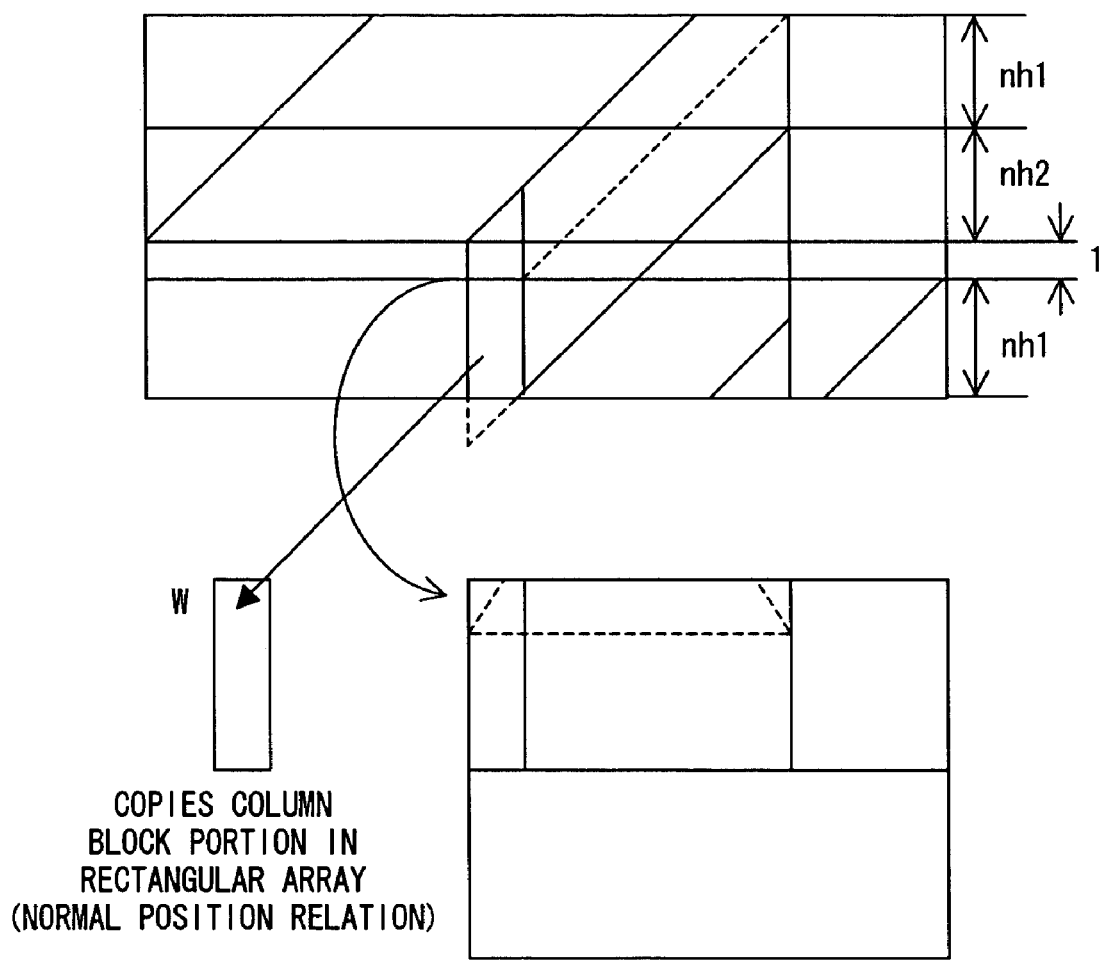
FIG. 5 is an explanatory diagram of the storage from the band matrix stored in compress mode to the working area of the column block.

FIG. 5 is an explanatory diagram of the storage method of the column block to the working area for performing the LU decomposition. Basically, in the storage of the column block in FIG. 3, the column block comprising the diagonal factors is first stored from the uppermost left side. However, generally described here is the storage of a column block starting with the diagonal factor of an arbitrary position to the working area.

The column block in the embodiments according to the present invention is a block comprising the factors of a plurality of columns where the diagonal factor is the uppermost left factor, and generally comprises portions excluding the portions diagonal to the upper side and to the lower side.

In compress mode described in FIG. 4 and FIG. 5, the factors in a plurality of columns comprising the column block is stored in a form in which the row is misaligned by one row in every column and does not have the correct positional relation between the column and the row as shown in FIG. 3. In other words, in FIG. 5, the factor of the first column in the column block which should be copied to the working area W starts with the diagonal factor, and the factor of the next column starts with the factor in the row located just above the diagonal factor. Thus, the factors in the rows sequentially misaligned by one row are stored in a form so as to allow the row and the column to have a normal positional relation in the rectangular array as the working area W, in a form that compensates this misalignment. Since the LU decomposition is performed on the column block after the relation between the row and the column is compensated to a normal positional relation, the updating of the matrix by using the LU decomposition result can be performed by the computation of the matrix product, and thereby the processing efficiency by the parallel processing is improved.

Figure 6:
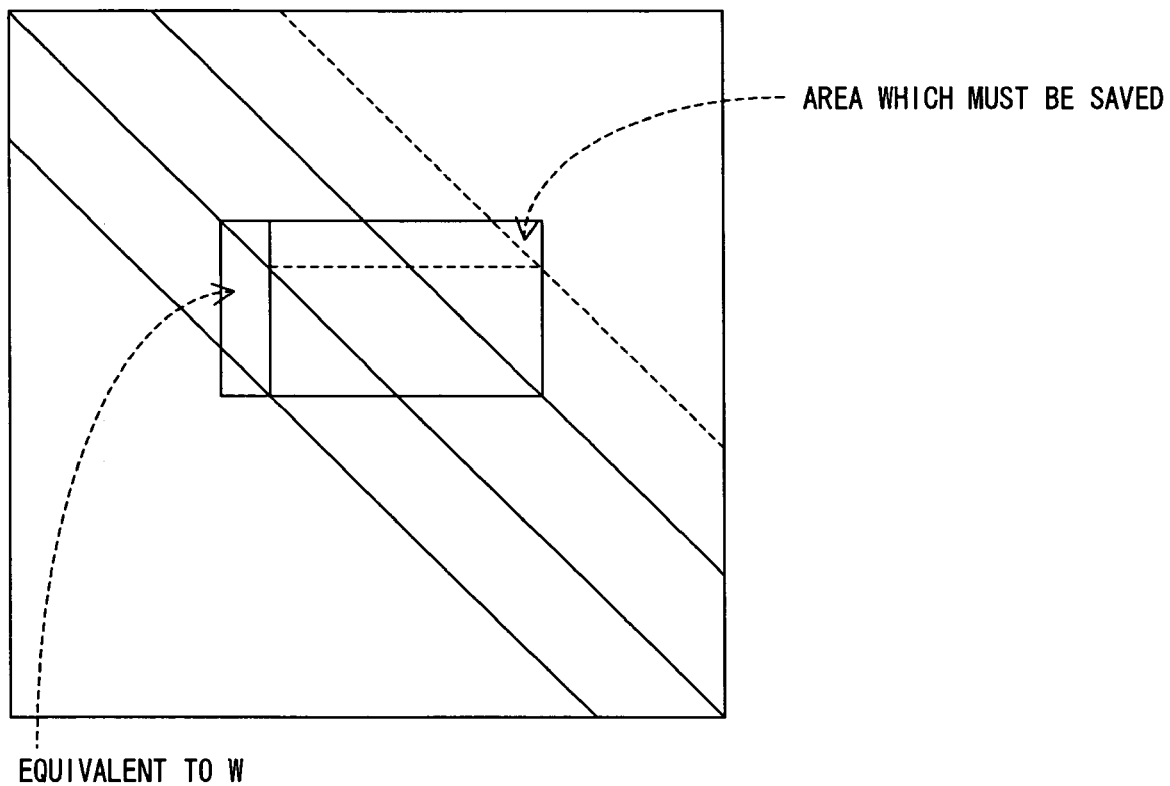
FIG. 6 is a diagram explaining the position of the column block in the band matrix.

FIG. 6 is an explanatory diagram of the position of the column block in the band coefficient matrix. In the same diagram, the upper left corner is the factor on the main diagonal line, and the rectangular block comprising a plurality of columns indicates the column block which is stored in the working area W. The horizontally wide rectangular area with solid lines comprising the column block is the diagram shown in the lower section in FIG. 5, and is equivalent to the vertically long rectangle in the upper left and the horizontally wide rectangle in the upper right. In addition, in FIG. 5, the slanted solid line and the dotted line are all parallel, and their gradient matches with that of the slanted solid line explained in FIG. 4. In addition, the area which must be saved in FIG. 6 is described later.

Figure 7:
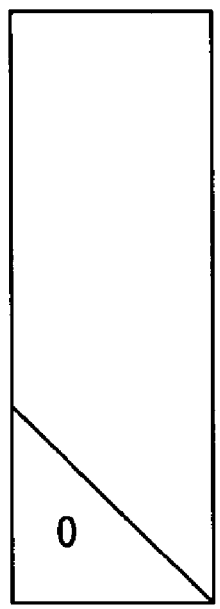
FIG. 7 is an explanatory diagram of the 0 setting at the lower left triangular portion of the column block.

FIG. 7 is an explanatory diagram of the 0 setting at the lower left triangular portion of the column block which is copied to the working area W. The lower triangular area is equivalent to the area which exceeds the boundary of the lower band as shown in FIG. 6, and because the factors in the area are all 0, 0 is set in the lower left triangular portion of the column block which is copied to the working area W as shown in FIG. 7.

The LU decomposition is executed on the column block, which is copied to the working area W in the way explained above, in parallel by using the method as disclosed in the afore-mentioned patent reference 1. Although the details of the parallel processing are described in the patent reference 1, the outline is described by using FIG. 8.

Figure 8:
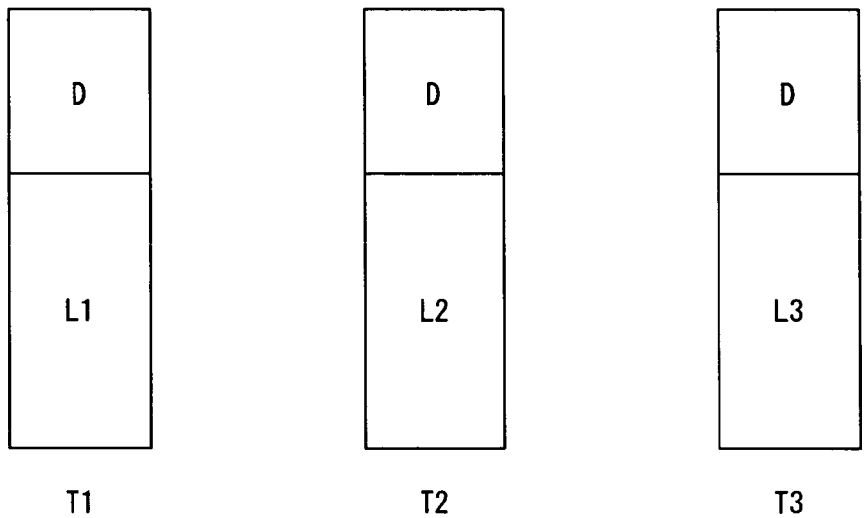
FIG. 8 is an explanatory diagram of the parallel processing in the LU decomposition of the column block.

In FIG. 8, taking a parallel processing performed by three processors as an example, the diagonal portion of the column block is determined to be D, the portion below this is the first-dimension, namely, L1, L2 and L3 which are equally divided by the number of the rows are allocated to the three threads (processors) T1 to T3, each thread performs the operations D+L1, D+L2 and D+L3. In other words, the LU decomposition is performed on the column block by performing the operation on the diagonal portions redundantly. In the LU decomposition, the row permutation using partial pivoting is performed on not only the right side of the column but also on the entire block width.

The LU decomposition results are copied back to the band matrix storage areas, namely, the corresponding columns in the areas as described in FIG. 4. Copy back is performed after the row permutation on the left side of each column, out of the row permutations performed in the LU decomposition processing, is cancelled.

Figure 9:
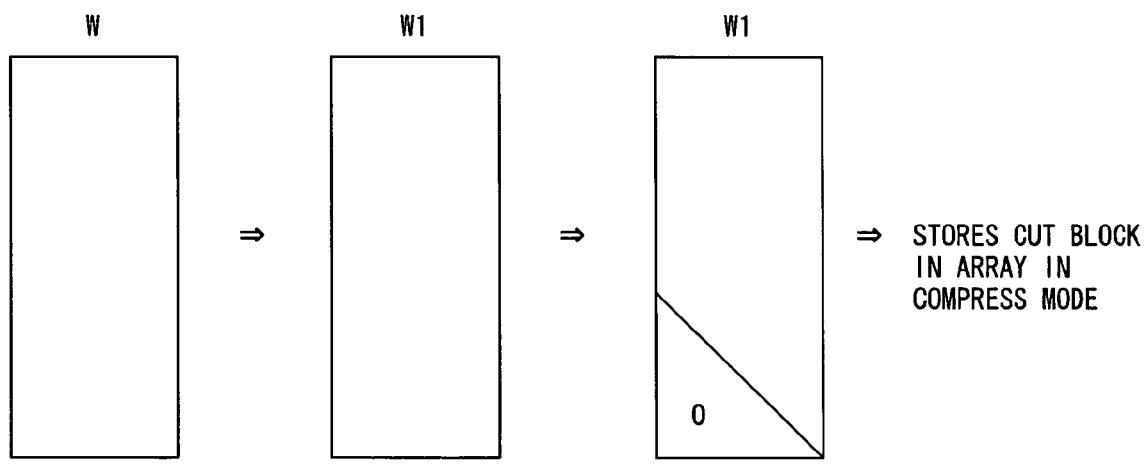
FIG. 9 is an explanatory diagram of the cancellation of the permutation of the rows on the left side of each column in the LU decomposition result of the column block.

FIG. 9 is an explanatory diagram of the cancellation of the row permutation on the left of each column. In the same diagram, the LU decomposition is performed, the results which are stored in the working area W are copied to the working area 1 which is the same size as the working area W, and the row permutation performed on the left side of each column is cancelled in the working area W. If the rows are permuted in the LU decomposition of the column blocks, information on the permutation is regarded to be stored in a certain one-dimensional array IP(n), and the row permutation on the left side is cancelled based on this information. As a result, 0 is stored again in the lower left triangular portion of the working area W1. Furthermore, the cancellation result is stored in the storage area of the band matrix in compress mode, namely, in the corresponding column in FIG. 4. In addition, the LU decomposition result in the working area W is utilized when update of the row and matrix, which is later described, is performed.

The cancellation of the row permutation on the left side is related to the storage form of the band matrix described in FIG. 4. Although the corresponding row block and matrix are updated following the LU decomposition of the column blocks, if the result of the row permutation on the left side remains, the factor corresponding to the area further below the area of the lower row number nh1 in FIG. 4 may not be 0, and the row permutation on the left side is cancelled to conserve the storage area of the memory. Row block and matrix which are described here as the objects for update are described in FIG. 10.

Thereafter, the updates of the row block and the corresponding matrix are performed. However, prior to these updates, the portion that may be collapsed by updating, namely data in an area, in the storage form in FIG. 4, where the factor in the portion which should essentially be 0 may possibly not be 0, is saved to the working area for data saving beforehand, and after the area is set to 0, the updates of the row block and the matrix is performed. This portion is the area which must be saved in FIG. 6. In other words, the triangular portion is equivalent to the area which is further above the area of the upper row number nh1 in the array form in FIG. 4, and if there is a possibility that this portion may be damaged by permuting the rows, this area must be saved.

After the value of the factor in the area that may be thus damaged is saved, the row block and matrix are updated. The update is performed by using the result of the column block on which the LU decomposition has been performed which is copied back to the band matrix storage area in compress mode. Therefore, the matrix which is the object of the row block update and the matrix update are transferred to the sub-routine, which performs the updates of the row block and the matrix for example, as an array wherein the row and the column have a normal positional relation in which the misalignment of the columns is compensated on the area stored in compress mode, and the processing is performed by the subroutine thereafter. In this case, in regards to the factors in the area where the value of the factors is saved due to possibility of damage, the row permutation, the updating of the row block and the matrix are performed after setting the value to 0, as stated above. In these updates, the LU decomposition results of the column block which remain in the afore-mentioned working area W are utilized. Upon completion of the update, the portion which may have been damaged and which had been saved is returned to the original location.

FIG. 10 is a detailed explanatory diagram of the parallel processing of the column block update, and the update of the matrix corresponding to the column block and the row block. In the same diagram, in regards to the row blocks comprising U1 to U4, the permutation corresponding to the row permutation performed in the LU decomposition of the column block before the update is performed. This permutation can also be performed through parallel processing by, for example, determining U1 to U4, and the lower matrixes C1 to C4 thereunder to be the first dimension, or in other words dividing by the row numbers, and allowing the four processors to independently take charge of each processing.

In the row block update, the update processing of Ui is performed in parallel by computing in parallel the matrix products of the inverse matrix of the lower triangular matrix DL in the diagonal portion of the column block with that of each Ui of the divided portions in the row block. Furthermore, in the updating of the remaining matrixes, the update processing of Ci is performed in parallel by deducting the product of L excluding the diagonal portion of the column block and Ui from the divided matrix portion Ci. Thus, by processing in parallel the operations from the LU decomposition of the column block to the matrix updating, operation intensity regarding data loaded from the memory can be enhanced and the operation performance of a CPU can be brought out, even by a scalar computer with a low memory access performance. After the LU decomposition of the band matrix is completed by the foregoing processing, the processing of the solver section for finding the solution of the simultaneous equations by the processing of forward-substitution (forward-elimination) and back-substitution is performed. Even in regards to the processing of the solver section, the vector could not be updated by the matrix vector product because, as stated above, conventionally, the band matrix was stored in compress mode, and in the permutation of the rows performed in the process of the LU decomposition, the permutation of the rows on the left side of each column were cancelled and stored. Therefore, in the embodiments according to the present invention, the processing shall be executed after the row permutation on the left side of the column which was cancelled is performed again, before the band matrix stored in compress mode is copied to the working area and processed. This allows the updating of the vector using the matrix vector product to be performed, and the efficiency of the processing can be improved by the parallel processing.

Figure 11:
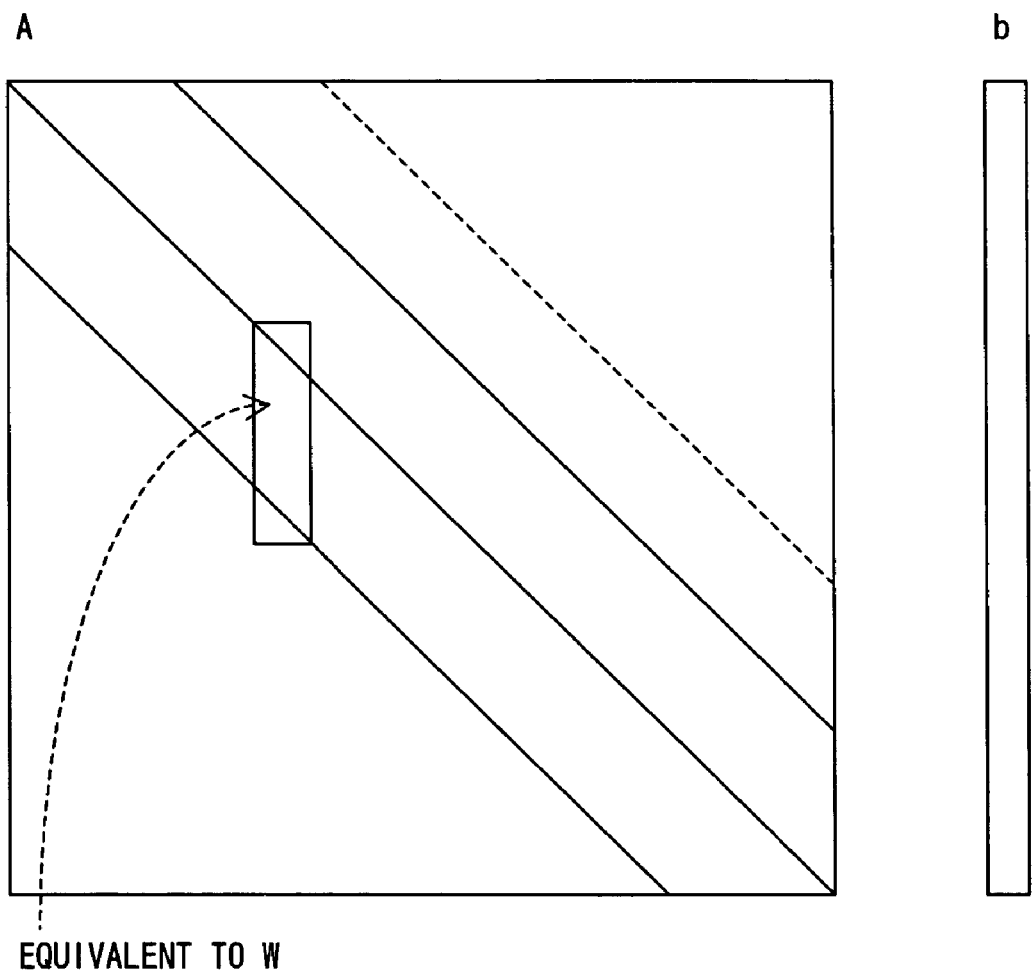
FIG. 11 an explanatory diagram of the storage of the column block to the working area in the parallel solution of the solver portion.
Figure 12:
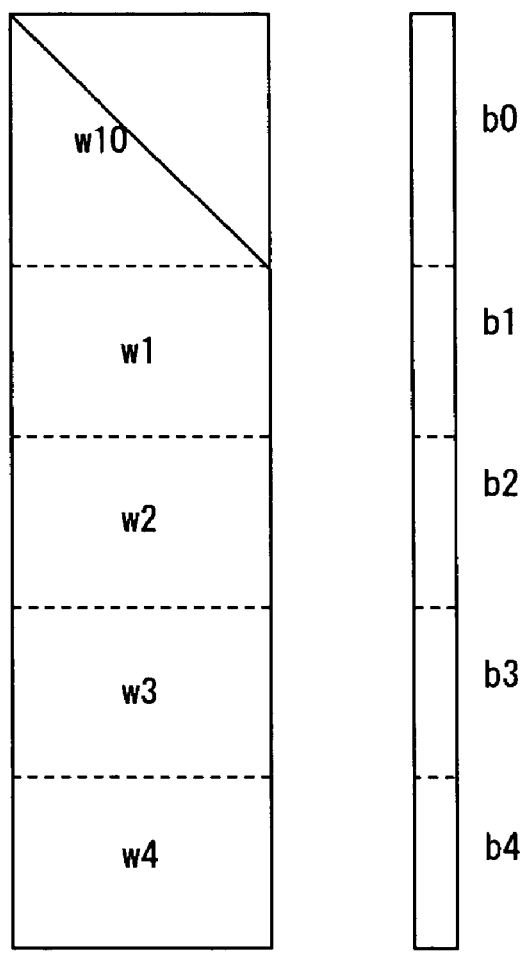
FIG. 12 is an explanatory diagram of the parallel update processing of the constant vector corresponding to the column block.

The parallel processing of the solver section is explained by using FIG. 11 and FIG. 12. FIG. 11 is an explanatory diagram of the storage (copying) of the column block from the band matrix to the working area. As in the processing in the LU decomposition, the column block comprising a plurality of columns so that the diagonal factor is located at the uppermost left corner is copied to a certain working area. As in the foregoing, the lower left triangular area is originally the area where the factor of 0 is stored, and 0 is cleared there. The row permutation of the left side of each column is, then, performed in the working area.

The row permutation is performed by using the information of the row permutation performed in the process of the LU decomposition, namely, the afore-mentioned IP(n). In the permutation information, information on the row of the destination for the permutation performed to n=a first row, for example, is stored. For example, if IP(1)=22, this indicates that the $1^{st}$ row and the $22^{nd}$ row are permuted, and in addition, if IP(10)=2, it is determined from the permutation information that the $10^{th}$ and the $2^{nd}$ rows are permuted, and the row permutation on the left side of each column is performed by using this information.

FIG. 12 is an explanatory diagram of the parallel processing in forward-elimination where the factor of the constant vector or the like is permuted, after the row permutation of the column block such as this. In the same diagram, first in response to the row permutation, areas in which the corresponding vector, namely, the constant vector b and the solution vector are stored are permuted by using information to which the permutation information IP(n) is stored, for example the information of the first dimension array, the equation on the lower triangular matrix in the diagonal portion of the column block is solved by forward-elimination, and thereafter, the portion corresponding to the constant vector is updated by using the lower matrix in the diagonal portion within the column block. The processing is performed in parallel.

In FIG. 12, if the parallel processing is performed by using four processors, after the constant vector b is divided into b0, corresponding to the diagonal portion of the column block, and constant vector portions b1 to b4 each corresponding to the portions w1 to w4, which are the equally divided row numbers of the remaining portions of the column block, the simultaneous equation w10×x0=b0 regarding the lower triangular matrix w10 in the diagonal portion is solved, and b0 is updated by using the determined x0. Here, x0 is the portion, within the vectors of the solution x, which corresponds to the vector b0.

The parallel updating is performed on the remaining b1 to b4 of the constant vector by four processors. The updating processing is executed in parallel by the following equation using the already updated b0.

$$bi=bi-wi*b0 \ (i=1 \text{ - - - } 4)$$

Figure 13:
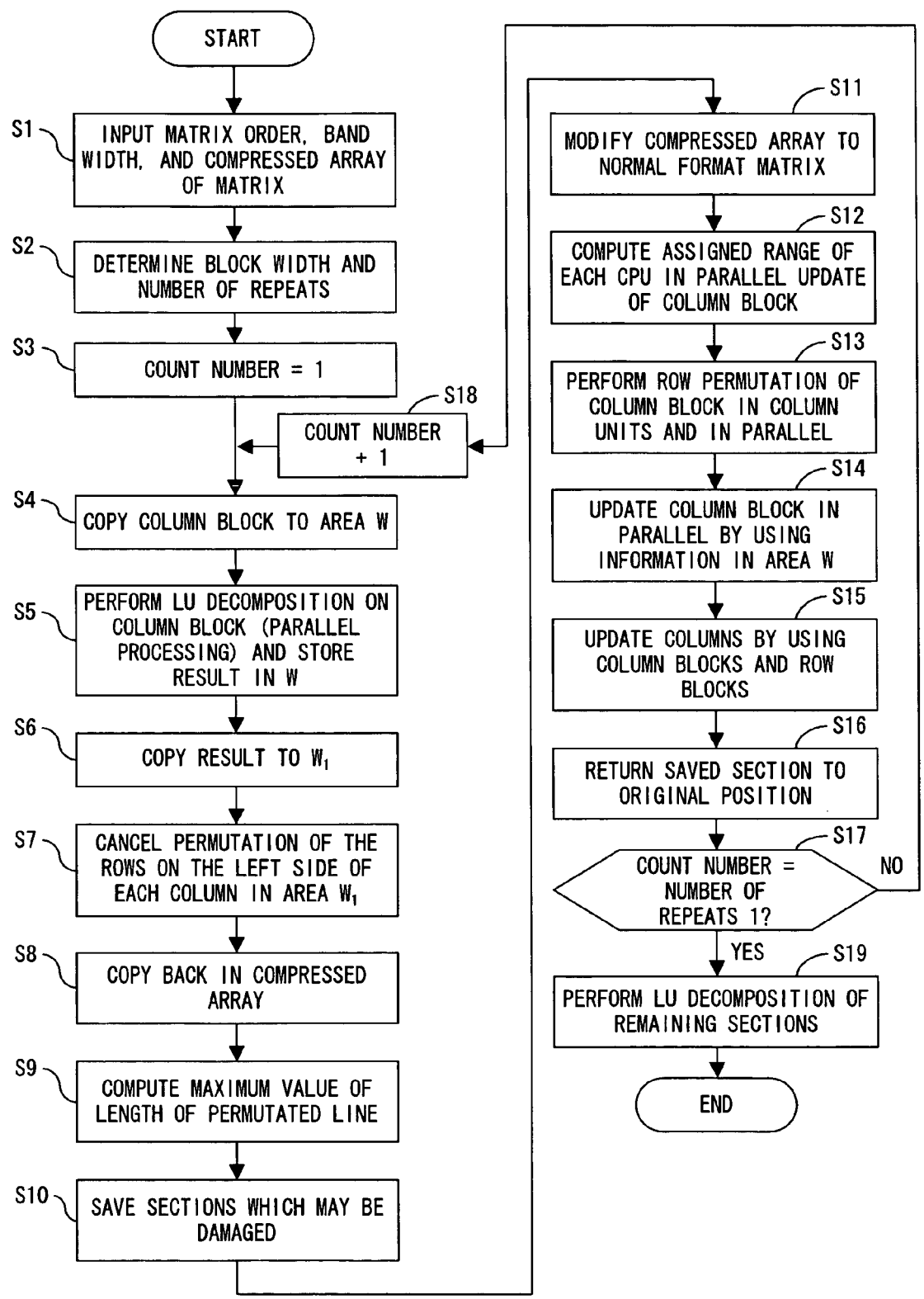
FIG. 13 is a detailed flowchart of the LU decomposition processing of the band matrix.

The LU decomposition and the solver processing in the embodiments according to the present invention are each described below in detail using flowcharts. FIG. 13 is a detailed flowchart of the LU decomposition of the band matrix. In the same flowchart, when the processing begins, first, the compress arranged data of the matrix order N, the lower band width nh1 and the upper band width nh2 as the band widths, and the band matrix stored in the compress mode is input in the step S1; the block width nblks and the number of repeats loop are determined in the step S2; and the value of the count number ncnt is determined to be 1 in the step S3. Here, although the matrix order N is, for example, several hundred thousands, the block width nblks is determined, for example, to be 40, the repeating number is determined by the following equation:

$$\text{loop}=(N+nblks-1)/nblks$$

In other words, the result of (nblks−1) added to N, which is then divided by nblks, is determined to be the repeating number, not simply the matrix order N divided by the block width nblks, and consideration is given in to the possibility of a remainder.

Subsequently, the column block is copied to the working area W in the step S4. As described in FIG. 3 to FIG. 5, the columns of the number of the block width nblks are copied in the working area W, first starting with the leftmost column comprising the uppermost left diagonal factor in FIG. 3.

If the columns which are copied are generally expressed by using the count number ncnt and the block number nblks, the columns which are copied are from (ncnt−1)*nblks+first column to ncnt*nblks-th column, and these columns are copied to the working area W, namely, the area of (nh1+nblks) row, nblks column so as to allow the rows and the columns to be in a normal positional relation.

Subsequently, the LU decomposition is performed on the column block and the result is stored in the working area W in the step S5. The LU decomposition of the column block is executed as a parallel processing by using the method of the Japanese Patent Laid-open Publication 2002-163246 as stated earlier.

After the LU decomposition of the column block is completed, the result is copied to the working area $W_1$ which is the same size as the area W in the step S6; the row permutation performed as the result of the pivoting selection on the left side of each column in the area is cancelled in the step S7; and the result of the cancellation is copied back to the storage array of the band matrix in compress mode in the step S8.

Subsequently, from the result of the LU decomposition of the column block in the step 9, the maximum value of the length of the row which requires the row permutation is computed, and if the maximum value exceeds the array area of the band matrix in compress mode, the portion which may be damaged due to exceeding the area is saved in the working area, the portion is set to 0 in the step S10. In addition, the area that should be saved is determined to have a relation between the row and the column of the band matrix stored in the array area in compress mode which is regarded to be compensated into a normal positional relation, and the factor of the area is set to 0.

Furthermore, the array in compress mode is actually compensated into a normal positional relation, namely into the matrix in the usual form, in the step S11; in the parallel updating of the row block, the second-dimension of the matrix, namely the allotted areas of each CPU where the parallel processing is performed corresponding to the number of the columns is computed in the step S12; the permutation of the rows to the row blocks is performed in column units in parallel in the step S13; and the parallel updating of the row block is performed by using the LU decomposition result of the column blocks stored in the working area W in the step S14. The matrixes corresponding to the column blocks and the row blocks are updated using these blocks in the step S15; the portions that have been saved are returned to the original location in the step S16; and the processing corresponding to the column block copied in the working area W is completed in the step S4.

Furthermore, whether or not the count number reaches the number of repeats −1 is determined in the step S17; and if this is not reached, the count number, namely the value of ncnt, is incremented and the processing after the step S4 is repeated in the step S18.

In the processing, first, in correspondence to count number ncnt=1, if the processing corresponding to ncnt=2 or more is repeated to the internal matrix portion which becomes small by, for example, removing the row and the column corresponding to the diagonal portion of the column block taken at the uppermost left in FIG. 3 and it is determined that the count number ncnt has reached the number of repeats −1 in the step S17, the LU decomposition is performed by every column within the remaining portion in the lowest right of the band matrix in the step S19, and the processing is completed.

Figure 14:
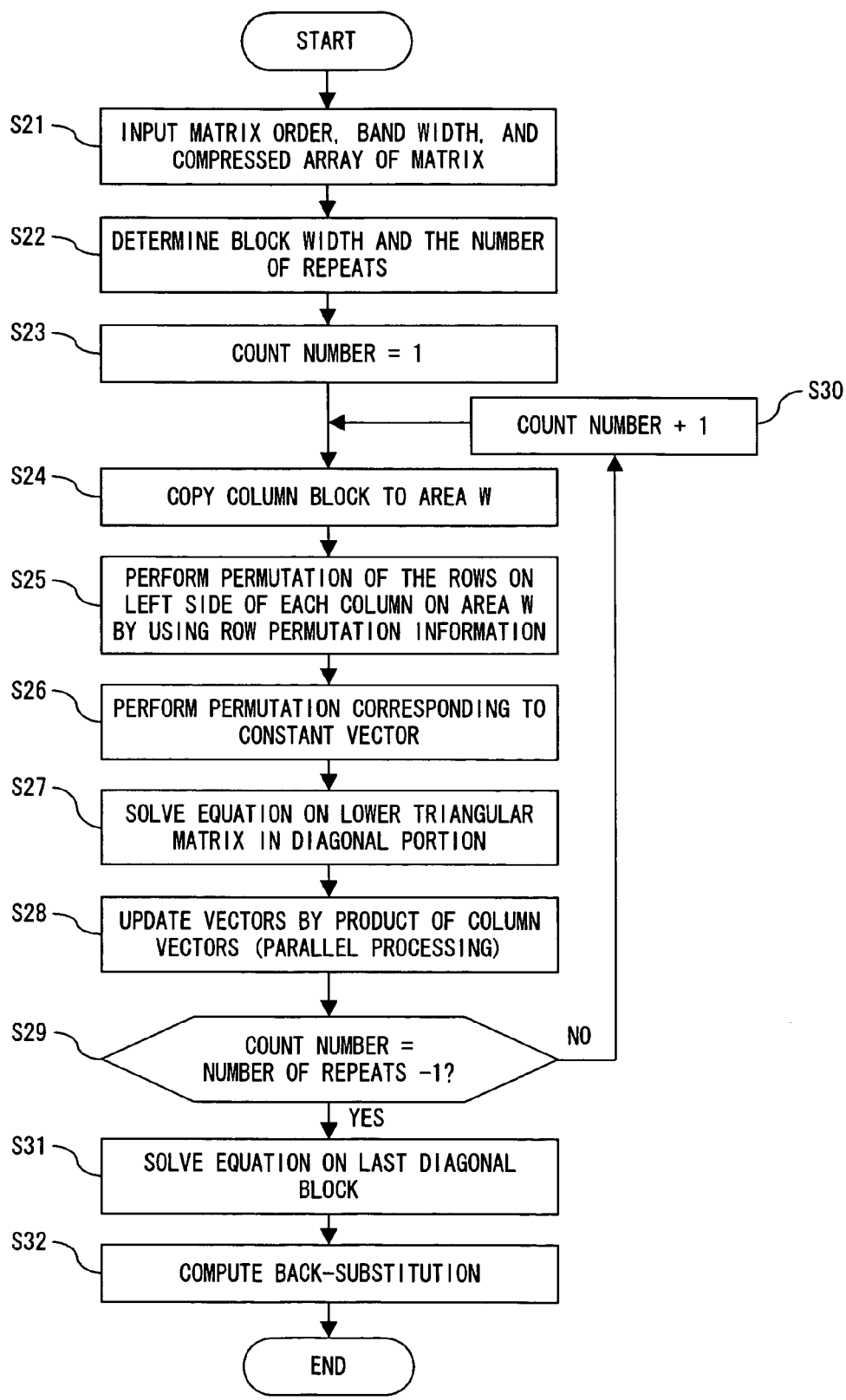
FIG. 14 is a detailed flowchart of the solver processing.

FIG. 14 is a detailed flowchart of the solver processing. In the same figure, after the processing begins, first, in the steps S21 to S23, each data is input, the block width and the number of repeats are determined, and the count number is initialized as in the steps S1 to S3 in FIG. 13. In the step S24, the column block from the band matrix, which is the LU decomposition result stored in compress mode, is copied to the working area W as in the step S4.

Furthermore, in the step S25, the row permutation on the left side of each column is performed in the working area W using the information on the row permutation performed in the process of the LU decomposition of the band matrix in FIG. 13, for example, the permutation information stored in the afore-mentioned one-dimensional array IP(n). In the step S26, the permutation of the factors corresponding to the constant vector b is performed, as well as the permutation of the areas which stores the solution vector; in the step S27, the equation for the lower triangular matrix in the diagonal portion of the column block is solved; and in the step 28, the matrix below the diagonal portions is allotted by each processor which performs the parallel processing, and the vector is updated by using the matrix vector product. In the step S29, whether or not the count number reaches the number of repeats −1 is determined; if this is not reached yet, the count number is incremented in the step S30; and the processing subsequent to the step S24 is executed corresponding to the next column block.

If the count number is determined to reach the number of repeats −1 in the step S29, the solution of the simultaneous equations on the last diagonal block is found in the step S31. In this processing, the update processing of the remaining vector portions is repeated up to the last factor, after the factor of the vector is permuted using the row permutation information.

Thereafter, the computation of back-substitution is performed in the step S32. In the processing of back-substitution, it is unnecessary to perform the row permutation, and the processing is performed sequentially by block width starting from the last, namely, the lower one. In the processing, the solver processing is completed after the simultaneous equations of the upper triangular matrix of the diagonal portion are solved, the processing of update is performed by the matrix vector product on the vector of the upper portion above the matrix by utilizing the solution vector, and the computation of the back-substitution is completed.

In the foregoing, the solution program for the simultaneous linear equations in the embodiments according to the present invention is described in detail. The computation of the simultaneous linear equations which have the band coefficient matrix is accelerated by using the program. As one example, if this program is compared with a code for a conventional vector computer, it has been determined that an acceleration of 14-times is realized even in a 1 CPU scalar computer. Further acceleration is expected by using the common memory-type scalar computer.

Figure 15:
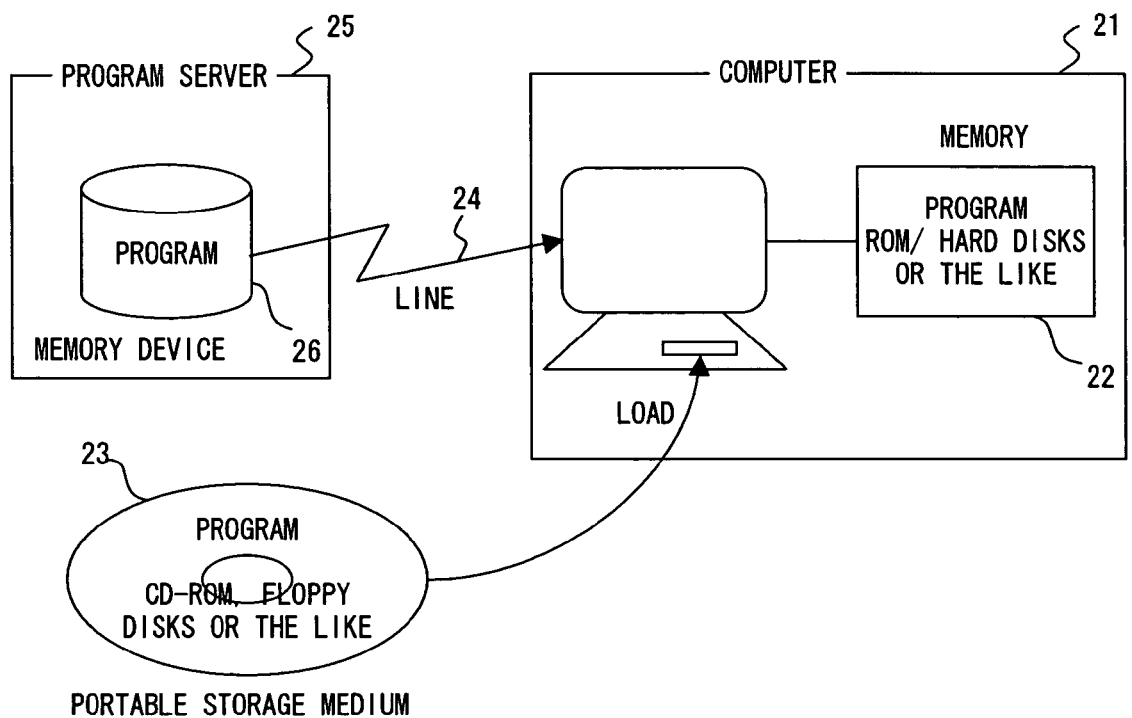
FIG. 15 is a diagram showing a configuration example of the recording media according to the present invention.

Here, an example of recording media capable of reading the recorded program by a computer is shown in FIG. 15.

As shown in the same figure, the recording media that can be utilized are, for example, RAM and ROM provided internally or as an external accessory in the computer 21, or the memory 22 such as hard disk device, or the portable recording media 23 such as FD (flexible disk), MO (magneto-optic disk), CD-ROM, or DVD-ROM.

In addition, the recording media may be the memory 26 provided by the computer which functions as the program server 25, connected with the computer 21 through the line 24. In this case, the transmission signal obtained by modulating the carrier with the data signal which expresses the program is transmitted from the program server 25 through the line 24 which the transmission medium, and the program can be executed by demodulating the received transmission signal to regenerate the program in the computer 21.

Therefore, the present invention is not limited only to the afore-mentioned embodiments, and various improvements and modifications are possible.

What is claimed is:

1. A recording medium for storing a program executable by a common-memory scalar parallel-processing computer for implementing a parallel matrix processing method in matrix processing, which includes LU (Lower-Upper) factorization, said program comprising:
   a processing for acquiring information about a band coefficient matrix;
   a processing for performing in parallel a LU decomposition on column blocks by allocating column blocks comprising a plurality of columns in the acquired band matrix information to the processors, respectively, and for storing the LU decomposition results in a working area on a plurality of memory modules;
   a processing for canceling a row permutation performed as the result of a pivoting selection on the left side of each column corresponding to the LU decomposition result, and for copying back the cancelled data result to a band matrix storage array area in a compressed form on the memory modules;
   a processing for computing a maximum value of the length of the row that requires a permutation on the basis of the LU decomposition result of the column blocks, and for determining whether the maximum value exceeds a capacity of the band matrix storage array area in the compressed form or not, and for saving excess data beyond the capacity in the memory modules when it is determined that the maximum value exceeds the capacity of the band matrix storage array area;
   a processing for making each processor update the band matrix in parallel by using the LU decomposition result of the column block stored in the working area; and
   a processing for returning the data saved in the memory modules to the band matrix update result, wherein at least one of the processing is carried out by the common-memory scalar parallel-processing computer having a plurality of processors, first caches respectively included in the processors, secondary caches corresponding respectively to the processors, an interconnection network connecting the processors via the secondary caches, and the memory modules which the processors access via the interconnection network.

2. The recording medium according to claim 1, wherein said matrix operation is an operation for the LU decomposition of said band matrix.

3. The recording medium according to claim 2, wherein, in the operation for the LU composition of said band matrix, after said matrix operation corresponding to said column block in the uppermost left portion of said band matrix is completed, the rows and the columns in the uppermost diagonal portion of the column block are removed from said band matrix, said matrix operation corresponding to said column block in the uppermost left portion of the matrix after the removal is repeated, and the LU decomposition is performed on the portion which ultimately remains.

4. The recording medium according to claim 3, wherein the computer is caused to perform the following processing which further execute the parallel matrix operations:

a processing for performing a row permutation corresponding to the pivoting selection on the left side of each column of the column block comprising a plurality of columns by utilizing the information on the row permutation performed in the parallel updating of said band matrix after the LU decomposition is performed on said ultimately remaining portion, and for performing a permutation of the factors corresponding to the column block within the factors of the constant vectors in the simultaneous equations corresponding to the permutation of the row on the left;

a processing for solving the simultaneous equations corresponding to the lower triangular matrix in the diagonal portion of the column block; and a processing for updating the vector through computation of the matrix vector product by utilizing the matrix below the diagonal portion of the column block.

5. The recording medium according to claim 4, wherein said parallel matrix operation is an operation of a forward-substitution processing which utilizes the LU decomposition result of said band matrix, after said parallel matrix operation corresponding to said column block at the uppermost left portion of said band matrix is completed, the rows and the columns in the uppermost left diagonal portion of the column block are removed from said band matrix, the parallel matrix operation corresponding to the column block at the upper left portion of the matrix after the removal is repeated, and the solution of the simultaneous equation to the lower triangular matrix in the ultimately remaining diagonal block is found.

6. The recording medium according to claim 1, wherein, in the parallel update processing of said band matrix, said cancelled data result is copied back, the position of the row of the factor in each column in the band matrix stored in the array area in compressed form is compensated, and the compensated matrix is updated.

7. The recording medium according to claim 6, wherein, in the parallel update processing of said band matrix, the following processing we performed:

a processing for updating in parallel the row blocks corresponding to the diagonal matrix in the column blocks by utilizing the LU decomposition results of the said column block and the band matrix after said compensation; and a processing for updating in parallel the matrix corresponding to the column block and the row block by utilizing the update result of the row block.

8. The recording medium according to claim 1, wherein the program further causes the computer to execute the following processing:

a processing for performing a row permutation corresponding to a pivoting selection on a left side of each column of a column block on a basis of the information on the row permutation performed in the updating of the band coefficient matrix after a LU decomposition operation of the band coefficient matrix is completed, and for performing the permutation of the factors corresponding to the column block in the factors of a constant vector in the simultaneous equations corresponding to the row permutation on the left;

a processing for solving the simultaneous equations corresponding to a lower triangular matrix in a diagonal portion of the column block; and a processing for updating the vector in parallel through a respective processor's computation of the matrix vector product by utilizing the matrix below the diagonal portion of the column block.

* * * * *

UNITED STATES PATENT AND TRADEMARK OFFICE
CERTIFICATE OF CORRECTION

PATENT NO.        : 7,603,402 B2                                    Page 1 of 1
APPLICATION NO.   : 11/006385
DATED             : October 13, 2009
INVENTOR(S)       : Nakanishi It is certified that error appears in the above-identified patent and that said Letters Patent is hereby corrected as shown below:

On the Title Page:

Under "Other Publications," please insert the following: --G.H. Golub et al.; Matrix Computations, 3$^{rd}$ Ed.; The Johns Hopkins University Press, pp.19-20; pp.152-160; June 7, 2002--.

In the Claims:

Col. 14, line 19, delete "we" and insert --are-- therefore.

Signed and Sealed this
Fourth Day of August, 2015

Michelle K. Lee
*Director of the United States Patent and Trademark Office*